US009430694B2

(12) United States Patent
Iliadis et al.

(10) Patent No.: US 9,430,694 B2
(45) Date of Patent: Aug. 30, 2016

(54) FACE RECOGNITION SYSTEM AND METHOD

(71) Applicant: TCL RESEARCH AMERICA INC., San Jose, CA (US)

(72) Inventors: Michael Iliadis, San Jose, CA (US); Haohong Wang, San Jose, CA (US)

(73) Assignee: TCL RESEARCH AMERICA INC., San Jose, CA (US)

( * ) Notice: Subject to any disclaimer, the term of this patent is extended or adjusted under 35 U.S.C. 154(b) by 0 days.

(21) Appl. No.: 14/534,688

(22) Filed: Nov. 6, 2014

(65) Prior Publication Data

US 2016/0132717 A1    May 12, 2016

(51) Int. Cl.
G06K 9/36    (2006.01)
G06K 9/00    (2006.01)
G06F 17/30    (2006.01)

(52) U.S. Cl.
CPC ..... G06K 9/00261 (2013.01); G06F 17/30256 (2013.01); G06F 17/30598 (2013.01); G06K 9/00288 (2013.01)

(58) Field of Classification Search
USPC ........ 382/103, 107, 115–118, 124, 155–167, 382/190, 217, 218
See application file for complete search history.

(56) References Cited

U.S. PATENT DOCUMENTS

| | | | | |
|---|---|---|---|---|
| 7,227,976 B1 * | 6/2007 | Jung | ................. | G06K 9/00228 345/419 |
| 7,515,173 B2 * | 4/2009 | Zhang | .................... | H04N 7/144 348/14.01 |
| 8,037,080 B2 * | 10/2011 | Koren | .............. | G06F 17/30029 707/608 |
| 8,073,287 B1 * | 12/2011 | Wechsler | .......... | G06K 9/00281 359/306 |
| 8,406,525 B2 * | 3/2013 | Ma | ..................... | G06K 9/00275 382/159 |

(Continued)

FOREIGN PATENT DOCUMENTS

CN        103034841 A    4/2013

OTHER PUBLICATIONS

Bao et al. "Inductive Robust Principal Component Analysis" IEEE Transactions on Image Processing, vol. 21, No. 8, Aug. 2012, pp. 3794-3800 (pp. 1-7).*

(Continued)

*Primary Examiner* — Chan Park
*Assistant Examiner* — Mia M Thomas
(74) *Attorney, Agent, or Firm* — Anova Law Group, PLLC

(57) ABSTRACT

A face recognition method is provided. The method includes dividing an input video into different sets of frames and detecting faces of each frame in the input video. The method also includes generating face tracks for the whole video. Further, the method includes applying a robust collaborative representation-based classifier to recover a clean image from complex occlusions and corruptions for a face test sample and perform classification. In addition, the method also includes outputting the video containing the recognized face images.

13 Claims, 5 Drawing Sheets

(56) References Cited

U.S. PATENT DOCUMENTS

| | | | | |
|---|---|---|---|---|
| 2002/0067258 A1* | 6/2002 | Lyons | G06K 9/00228 | 340/541 |
| 2002/0186880 A1* | 12/2002 | Penev | G06K 9/00201 | 382/154 |
| 2004/0186718 A1* | 9/2004 | Nefian | G06K 9/6293 | 704/256 |
| 2006/0187305 A1* | 8/2006 | Trivedi | G06K 9/00234 | 348/169 |
| 2007/0183634 A1* | 8/2007 | Dussich | G06K 9/00295 | 382/118 |
| 2007/0288453 A1* | 12/2007 | Podilchuk | G06F 17/30259 | |
| 2008/0063264 A1* | 3/2008 | Porikli | G06K 9/00369 | 382/159 |
| 2008/0170751 A1* | 7/2008 | Lei | G06T 7/2006 | 382/103 |
| 2008/0187174 A1* | 8/2008 | Metaxas | G06K 9/00335 | 382/103 |
| 2008/0279424 A1* | 11/2008 | Berrani | G06K 9/00288 | 382/118 |
| 2009/0074259 A1* | 3/2009 | Baltatu | G06K 9/6284 | 382/118 |
| 2009/0169065 A1* | 7/2009 | Wang | G06K 9/00268 | 382/118 |
| 2010/0045799 A1* | 2/2010 | Lei | G06K 9/00369 | 348/169 |
| 2010/0188328 A1* | 7/2010 | Dodge | G06F 3/0346 | 345/156 |
| 2010/0238191 A1* | 9/2010 | Lee | G06K 9/00221 | 345/589 |
| 2011/0064302 A1* | 3/2011 | Ma | G06K 9/00275 | 382/159 |
| 2011/0243449 A1* | 10/2011 | Hannuksela | G06K 9/00221 | 382/190 |
| 2011/0304541 A1* | 12/2011 | Dalal | G06F 3/017 | 345/158 |
| 2012/0140015 A1* | 6/2012 | DeGrazia | H04N 7/15 | 348/14.01 |
| 2013/0129229 A1* | 5/2013 | Ernst | G06K 9/6201 | 382/217 |
| 2013/0163966 A1* | 6/2013 | Kubsch | G06K 9/00711 | 386/353 |
| 2014/0298380 A1* | 10/2014 | Venkataswamy | H04N 21/8133 | 725/32 |
| 2015/0154441 A1* | 6/2015 | Zhang | G06K 9/00221 | 382/118 |
| 2016/0055368 A1* | 2/2016 | Cao | G06K 9/00268 | 382/195 |

OTHER PUBLICATIONS

Feng et al. "Online Robust PCA via Stochastic Optimization" Proc. Advances in Neural Information Processing Systems, Lake Tahoe, NV, Dec. 2013, pp. 404-412.*

Wright et al. "Robust Face Recognition via Sparse Representation" IEEE Transactions on Pattern Analysis and Machine Intelligence, vol. 31, No. 2, Feb. 2009—pp. 1-18.*

Zhao et al. "Robust Principal Component Analysis with Complex Noise" Proceedings of the 31 st International Conference on Machine Learning, Beijing, China, 2014. JMLR: W&CP vol. 32 pp. 1-9.*

Turk et al. "Face Recognition Using Eigenfaces" IEEE (1991) pp. 1-6.*

Turk et al. "Eigenfaces for Face Detection/Recognition" Journal of Cognitive Neuroscience, vol. 3, No. 1, pp. 71-86, 1991.*

Mehta et al. "Robust Collaborative Filtering" RecSys'07, Oct. 19-20, 2007, Minneapolis, Minnesota, USA. Copyright 2007 ACM—pp. 1-8.*

* cited by examiner

FACE RECOGNITION SYSTEM AND METHOD

FIELD OF THE INVENTION

The present invention generally relates to the field of computer technologies and, more particularly, to techniques for a face recognition system and method.

BACKGROUND

Face recognition systems have been quite popular in today's commercial and entertainment businesses. Face recognition in videos is a technical problem in computer vision that targets at locating and identifying faces in a video sequence by a given set of images that contain the faces with known identities. For example, video face recognition has been driven by its huge potential in developing applications in many domains including video surveillance security, augmented reality, automatic video tagging, medical analysis, quality control, and video-lecture assessment. Even though the face recognition is a relatively easy task for human brains, it is challenging for machines due to large variations in appearance of identified objects in terms of orientation, illumination, expression and occlusion.

Many challenges exist for the face recognition using currently-available techniques. Recently, face recognition (FR) via sparse representation-based classification (SRC) and its extensions have proven to provide state-of-the-art performance. The main idea is that a subject's face sample can be represented as a sparse linear combination of available images of the same subject captured under different conditions (e.g., poses, lighting conditions, occlusions etc.). The same principle can also be applied when a face image is represented in a lower dimensional space describing important and easily identifiable features. In order to enforce sparsity, $l_1$ optimization algorithms can be employed. Then, the face class that yields a minimum reconstruction error is selected in order to classify or identify the subject, whose test image or sample is available. Sparse coding has also been proposed to jointly address the problems of blurred face recognition and blind image recovery.

However, $l_1$ optimization methods for improved face recognition rates can only be successful under certain conditions. Specifically, the sparse representation based face recognition assumes that training images have been carefully controlled and that the number of samples per class is sufficiently large.

From a different point of view, in order to remove outlier pixels from corrupted training data, the low-rank structure of face images has been recently investigated. The low-rank structure of similar faces is explored under the assumption that the images are of some convex Lambertian object under varying illumination. To recover subspace structures from data containing errors, methods such as Robust Principal Component Analysis (RPCA) and Low-Rank Representation (LRR) have been proposed. However, the above methods are transductive and cannot remove corruptions from new data efficiently. A desired property in face recognition is not only to recover clean images from corrupted training data, but also to recover a clean image from complex occlusions and corruptions for any given test sample.

The disclosed methods and systems are directed to solve one or more problems set forth above and other problems.

BRIEF SUMMARY OF THE DISCLOSURE

One aspect of the present disclosure includes a face recognition method. The method includes dividing an input video into different sets of frames and detecting faces of each frame in the input video. The method also includes generating face tracks for the whole video. Further, the method includes applying a robust collaborative representation-based classifier to recover a clean image from complex occlusions and corruptions for a face test sample and perform classification. In addition, the method also includes outputting the video containing the recognized face images.

Another aspect of the present disclosure includes a face recognition system. The system includes a face detection module configured to find automatically location of faces in a sequence of video frames and an algorithm module configured to recover a clean image from complex occlusions and corruptions through an inductive robust principal component analysis (IRPCA) algorithm to initialize a low-rank representation with an $l_1$ half quadratic (LRR-HQ-L1) algorithm and estimate a weight matrix through the LRR-HQ-L1 algorithm. The system also includes a face classifier configured to perform classification through a robust collaborative representation (RCR) algorithm and a dictionary configured to store face images in a database. Further, the system includes an output module configured to output the video containing the recognized face images.

Other aspects of the present disclosure can be understood by those skilled in the art in light of the description, the claims, and the drawings of the present disclosure.

DETAILED DESCRIPTION

Reference will now be made in detail to exemplary embodiments of the invention, which are illustrated in the accompanying drawings. Wherever possible, the same reference numbers will be used throughout the drawings to refer to the same or like parts.

Figure 1:
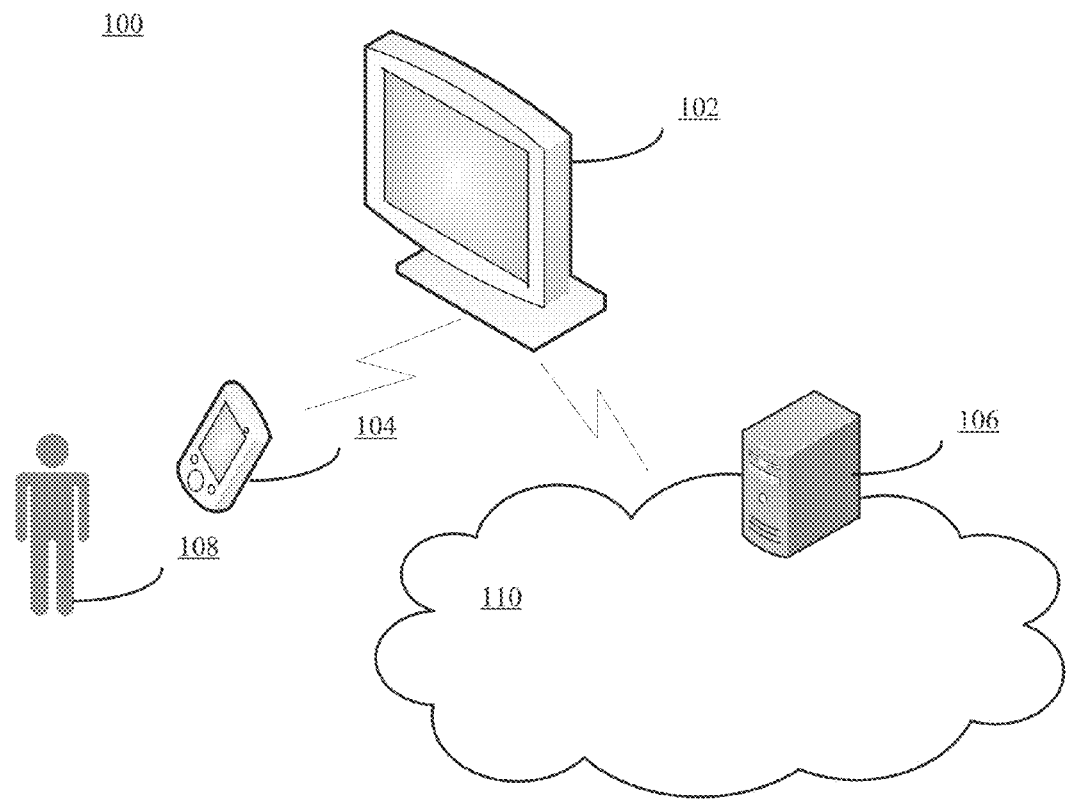
FIG. 1 illustrates an exemplary environment incorporating certain embodiments of the present invention.

FIG. 1 illustrates an exemplary environment 100 incorporating certain embodiments of the present invention. As shown in FIG. 1, environment 100 may include a television set (TV) 102, a remote control 104, a server 106, a user 108, and a network 110. Other devices may also be included.

TV 102 may include any appropriate type of TV, such as plasma TV, liquid crystal display (LCD) TV, projection TV, non-smart TV, or smart TV. TV 102 may also include other computing systems, such as a personal computer (PC), a tablet or mobile computer, or a smart phone, etc. Further, TV 102 may be any appropriate content-presentation device capable of presenting multiple programs in one or more channels, which may be controlled through the remote control 104.

The remote control 104 may include any appropriate type of remote control that communicates with and controls the TV 102, such as a customized TV remote control, a universal remote control, a tablet computer, a smart phone, or any other computing device capable of performing remote control functions. The remote control 104 may also include other types of devices, such as a motion-sensor based remote control, or a depth-camera enhanced remote control, as well as simple input/output devices such as a keyboard, a mouse, and a voice-activated input device, etc.

Further, the server 106 may include any appropriate type of server computer or a plurality of server computers for providing video contents to the user 108. The server 106 may also facilitate communication, data storage, and data processing between the remote control 104 and TV 102. TV 102, remote control 104, and server 106 may communicate with each other through one or more communication networks 110, such as a cable network, a phone network, and/or a satellite network, etc.

The user 108 may interact with TV 102 using remote control 104 to watch various programs and perform other activities of interest, or the user may simply use hand or body gestures to control TV 102 if motion sensor or depth-camera is used by TV 102. The user 108 may be a single user or a plurality of users, such as family members watching TV programs together.

Figure 2:
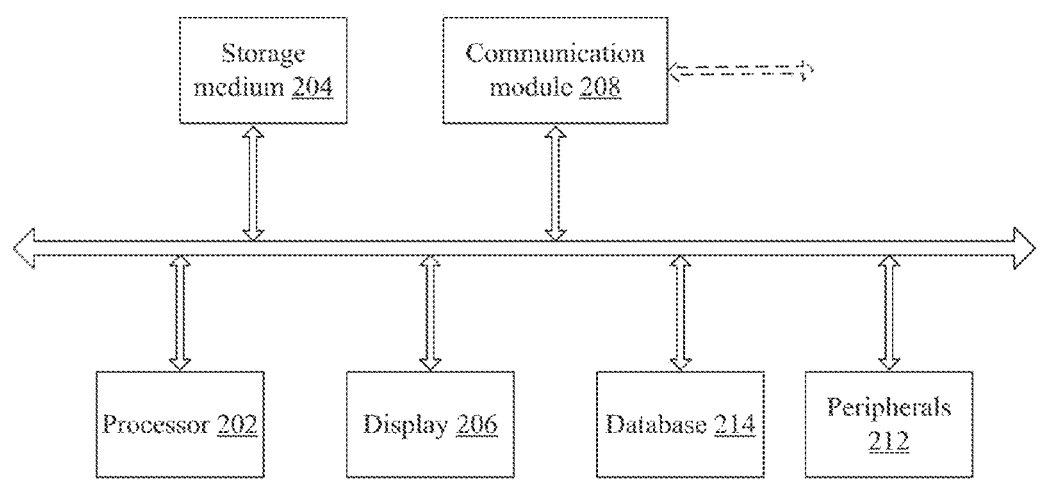
FIG. 2 illustrates an exemplary computing system consistent with the disclosed embodiments.

TV 102, remote control 104, and/or server 106 may be implemented on any appropriate computing circuitry platform. FIG. 2 shows a block diagram of an exemplary computing system 200 capable of implementing TV 102, remote control 104, and/or server 106.

As shown in FIG. 2, computing system 200 may include a processor 202, a storage medium 204, a display 206, a communication module 208, a database 210, and peripherals 212. Certain devices may be omitted and other devices may be included.

Processor 202 may include any appropriate processor or processors. Further, processor 202 can include multiple cores for multi-thread or parallel processing. Storage medium 204 may include memory modules, such as ROM, RAM, flash memory modules, and mass storages, such as CD-ROM and hard disk, etc. Storage medium 204 may store computer programs for implementing various processes when the computer programs are executed by processor 202.

Further, peripherals 212 may include various sensors and other I/O devices, such as keyboard and mouse, and communication module 208 may include certain network interface devices for establishing connections through communication networks. Database 210 may include one or more databases for storing certain data and for performing certain operations on the stored data, such as database searching.

In operation, the server 106, the TV 102, and/or the remote control 104 may perform a face recognition process for the user 108.

Figure 3:
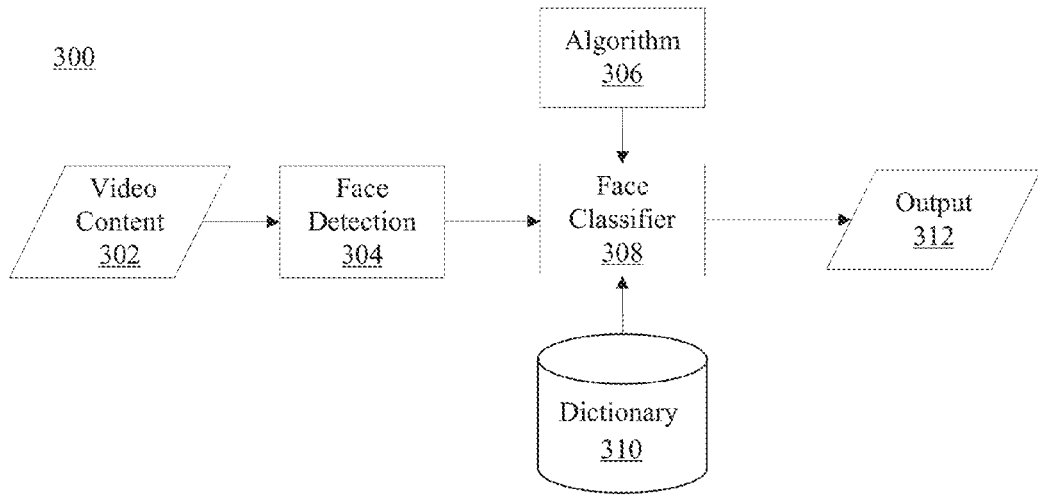
FIG. 3 illustrates a structure schematic diagram of an exemplary face recognition system consistent with the disclosed embodiments.

FIG. 3 illustrates a structure schematic diagram of an exemplary face recognition system 300 consistent with the disclosed embodiments. As shown in FIG. 3, the face recognition system 300 includes video content 302, a face detection module 304, an algorithm module 306, a face classifier 308, a dictionary 310, and an output module 312. Certain components may be omitted and other components may be added. The system 300 (e.g., the various components) may be implemented in hardware, software, or a combination of hardware and software.

The input video 302 may include any appropriate type of source for video contents and may contain various video sources. The contents from the input video 302 may include both video data and metadata. Plurality of frames may be associated with the video contents and may be provided to other modules for processing. A single picture may also be included. The input video is divided into different sets of frames.

The face detection module 304 may be configured to find automatically the location of the faces in a sequence of video frames. The face detection module 304 may reside within TV 102 or outside the TV 102 depending on particular applications.

The algorithm module 306 may be configured to recover a clean image from complex occlusions and corruptions through an inductive robust principal component analysis (IRPCA) algorithm to initialize a low-rank representation with an $l_1$ half quadratic (LRR-HQ-L1) algorithm and estimate the weight matrix through an LRR-HQ-L1 algorithm.

The face classifier 308 may be configured to perform classification through a robust collaborative representation (RCR) algorithm and give a final decision of the class identity.

Further, the dictionary 310 may include any appropriate database to store face images, etc. For example, an in-house or online database has collection of face-relevant photos. Specifically, for face recognition in a given movie and a set of actors, each actor's (i.e., targeting actor) name and movie's name are used as key words for querying in the dictionary to retrieve a set of images. This image set may contain mostly the targeting actor's images and a few other actors' images, with each image containing one or more actor's faces.

The output module 312 may be configured to output identified faces. Certain modules may be merged or omitted and other modules may be included.

Figure 4:
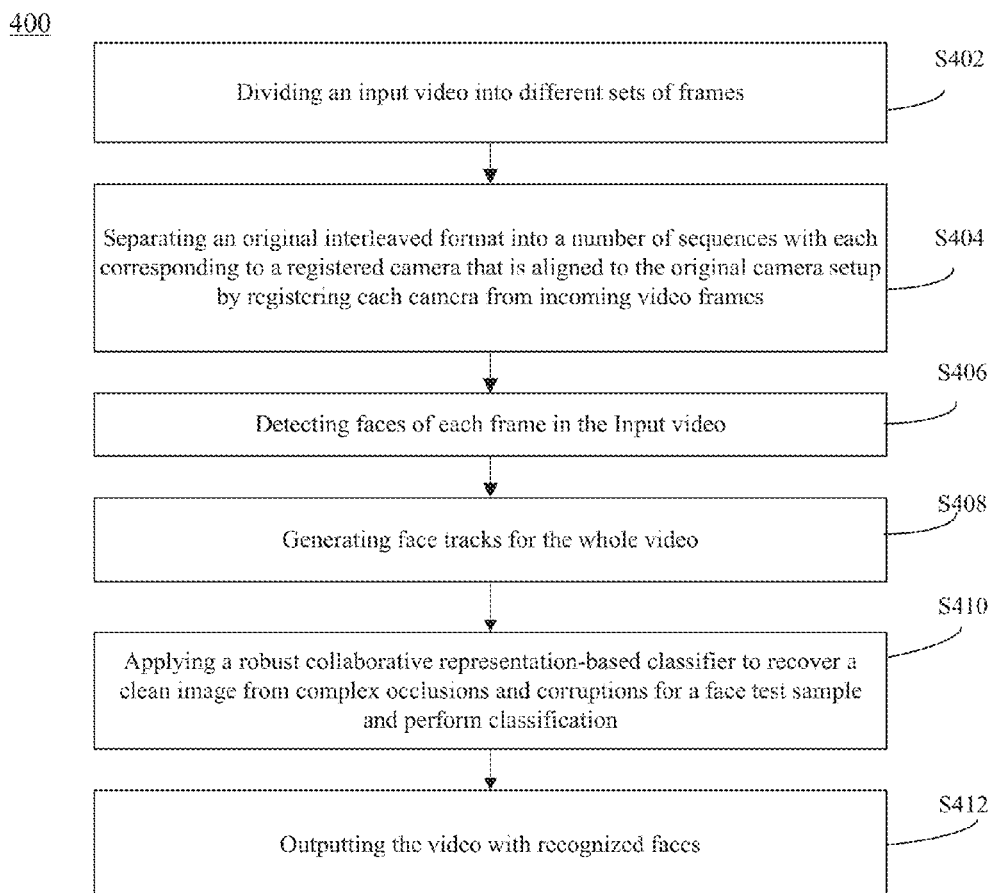
FIG. 4 illustrates a flow chart of an exemplary face recognition process consistent with the disclosed embodiments.

FIG. 4 illustrates a flow chart of an exemplary face recognition process 400 performed by the various modules in the face recognition system consistent with the disclosed embodiments.

As shown in FIG. 4, at the beginning, an input video is divided into different sets of frames (S402). Because a video is a sequence of frames and the changes between consecutive frames are relatively small due to typical frame rate for a video (e.g. 25 frames/second), instead of dealing with each frame individually, some grouping or clustering techniques may be applied to separate the whole video into different sets of frames with each set has similar frames for further processing.

Figure 5:
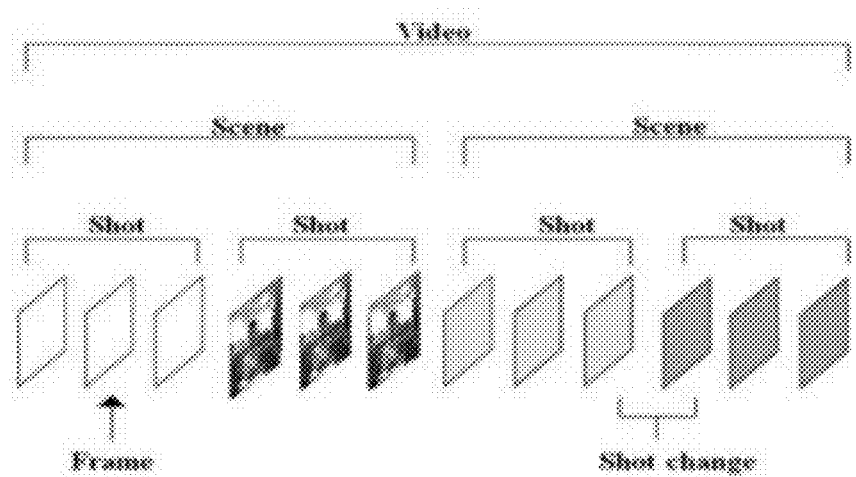
FIG. 5 illustrates a video stream being divided into different video components consistent with the disclosed embodiments.

For example, FIG. 5 illustrates a video stream being divided into different video components. As show in FIG. 5, a video stream may be divided into scenes, a scene may be divided into shots, and a shot may be divided into frames, etc. The frame can be further divided into objects and features of the video frame may be extracted for further processing.

Returning to FIG. 4, after obtaining the input video sequences, the video sequence is simplified into a frame sequence corresponding to registered camera that is aligned to the original camera setup by registering each camera from incoming video frames (S404).

A typical movie sequence is an interleaved format of a number of camera shots, and a camera take is a continuous recorded performance with a given camera setup. Camera registration, as used herein, may refer to registration of different cameras capturing video frames in a video sequence/stream. The concept of camera registration is based on the camera takes in reconstruction of video edits. A typical video sequence is an interleaved format of a number of camera shots, and a camera take is a continuous recorded performance with a given camera setup. By registering each camera from the incoming video frames, the original interleaved format can be separated into a number of sequences with each corresponding to a registered camera that is aligned to the original camera setup.

After the camera take is identified, faces of each frame in the video are detected (S406). Detecting the faces of each frame in the video can facilitate to produce face tracks before applying face recognition. That is, the face detection can be applied for each frame within each camera take. The face detection may find automatically the location of the faces in a sequence of frames.

The group of detected faces within a same camera take may be used as a face track. In this way, face tracks are generated for the whole video (S408). Specifically, a new face track is initialized by the first detected face for each camera take. For the rest frames of each camera take, if the distance between two detected faces from consecutive frames passes a pre-defined threshold, a new face track is initialized; otherwise this face is added to the current face track.

Further, a robust collaborative representation-based classifier is applied to recover a clean image from complex occlusions and corruptions for a face test sample and perform classification (S410). Existing state-of-the-art outlier detection algorithms and classifiers can be conveniently incorporated with a robust framework for collaborative representation. It is assumed that $y \in \mathbb{R}^d$ denotes a face test sample and $T=[T_i, \ldots, T_c] \in \mathbb{R}^{d \times n}$ denotes a matrix (i.e., dictionary) with a set of samples of c subjects stacked in columns, where $T_i \in \mathbb{R}^{d \times n_i}$ denotes the $n_i$ set of samples of the $i^{th}$ subject, such that $\Sigma_i n_i = n$.

Provided that the outlier detection inputs a test sample y and a face dictionary T and produces a weight diagonal matrix W, such that Wy is the the weighted test sample, where small values (close to zero) are given to outlier components (e.g., sunglass pixels). The outlier detection (OLD) process is denoted by:

$$W = OLD(y,T) \quad (1)$$

Provided that a classification (CLF) process inputs a test sample, a face dictionary and a weight diagonal matrix W and outputs an estimated class index, the estimated class index is denoted by:

$$\text{Identity}(y) = CLF(y,T,W) \quad (2)$$

Formula (1) is solved with the $l_1$ Half Quadratic Minimization which has been proven robust to occlusions and corruptions.

Figure 6:
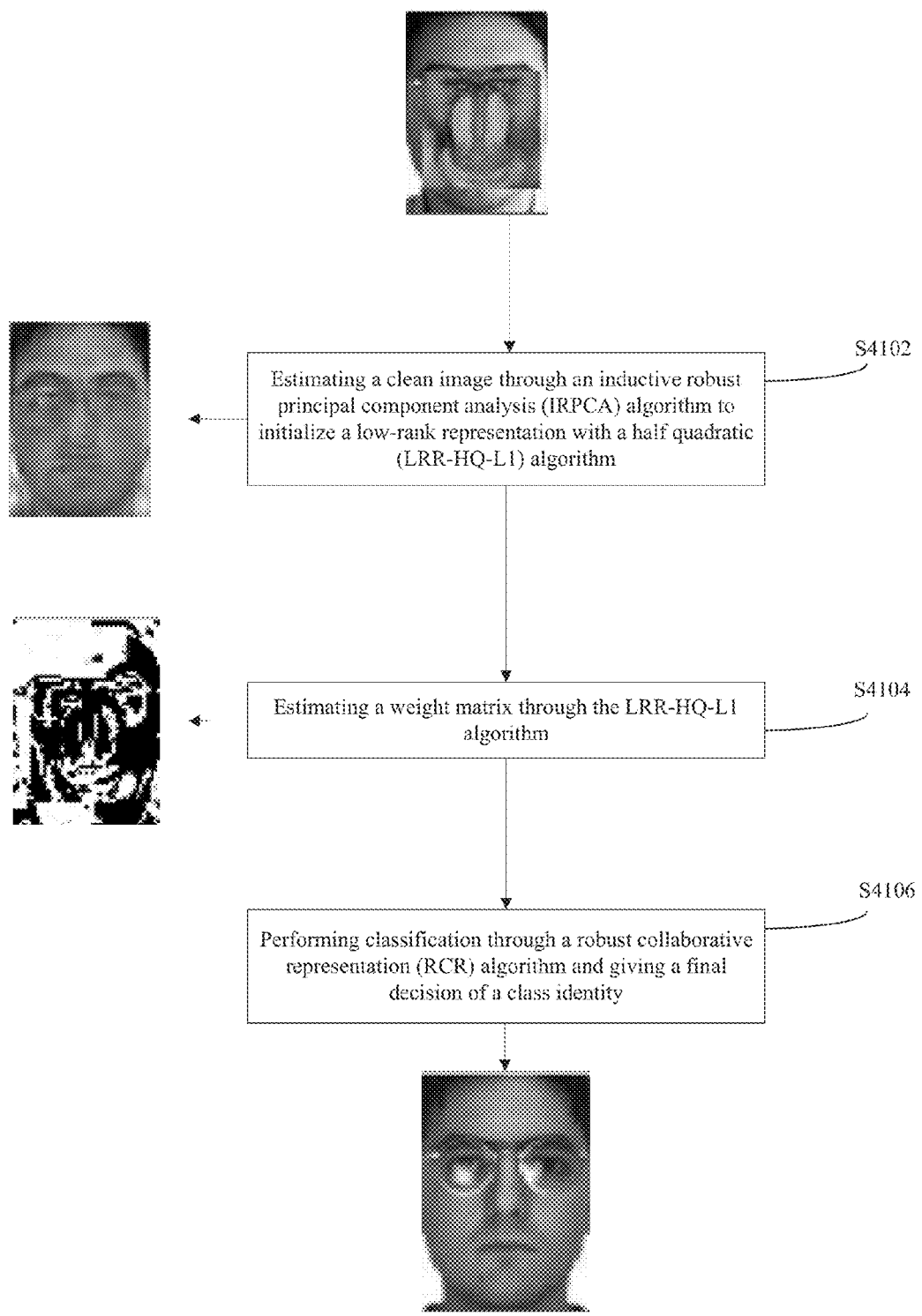
FIG. 6 illustrates an exemplary robust collaborative representation process consistent with the disclosed embodiments.

FIG. 6 illustrates an exemplary robust collaborative representation process consistent with the disclosed embodiments. As shown in FIG. 6, in order to initialize W for the Half Quadratic (HQ) Minimization, a clean test image through Inductive Robust Principal Component Analysis (IRPCA) is estimated (S4102).

A function K is half quadratic if the function K depends on two sets of variables a and w, so that K is a quadratic function of a. The augmented Half Quadratic function K is constructed from some nonquadratic criteria J and is defined by:

$$\min_w K(a, w) = J(a), \quad (3)$$

J(a) is the reconstruction function defined by:

$$J(a) = \Phi(a) + Q(a). \quad (4)$$

where $\Phi(a)$ and $Q(a)$ are defined as, $$\Phi(a) = \Sigma_{i=1}^d \phi(\delta_i)$$

$$Q(a) = \|a\|_1. \quad (5)$$

$\phi(\delta_i)$ is defined as, $$\phi(\delta_i) = \min_{w_i} \frac{1}{2} w_i(\delta_i)^2 + \psi(w_i). \quad (6)$$

From (4), (5) and (6), K(a,w) is defined by:

$$K(a,w) = \|W(y-Ta)\|_2^2 + \psi(w) + \lambda\|a\|_1 \quad (7)$$

where $\psi$ can be defined from 40 through convex duality relations. The overall $l_1$ HQ problem is minimized along a and w in an alternate fashion, $$\tilde{w}_i^{(t+1)} = \frac{\phi'(\delta_i^t)}{\delta_i^t}, \quad (8)$$

$$i = 1, \ldots, d$$

$$a^{(t+1)} = \operatorname{argmin}_a \|W^{t+1}(y-Ta)\|_2^2 + \lambda\|a\|_1. \quad (9)$$

The choice of the potential function $\phi$ and its corresponding weight function w can be given from M-estimators or any function that fullfils the conditions of the HQ potential functions as defined.

The above iterative algorithm is an iteratively reweighted least squares (IRLS) algorithm. Thus, there is a clear connection between Half Quadratic (HQ) and reweighted least squares. Even though under certain conditions a global convergence of K(a,b) is proven for any initial $\delta_i^0$, it is not clear whether the HQ function globally converges in the $l_1$ framework. For different initializations $\delta_i^0$, different Ws are obtained. A careful selection of the initialization can be to somewhat important for the FR performance. First, two potential initializations of $\delta_i^0$, are listed. Then, the initialization solution is provided as follows.

1. The initialization can be the test sample minus the mean dictionary image. That is, $\delta_i^0 = [Ta^0 - y]$, where $$a^0 = \left[\frac{1}{n}, \ldots, \frac{1}{n}\right].$$

2. Another potential solution for $\delta_i^0$ that depends on $a^0$ is naive reconstruction of $a^0$. That is, $a^0 = T/y$.

The representation of the first suggestion may diverge a lot from the test sample face since a mean face does not necessarily look like the test sample and can have a lot of errors. Thus, when the error with the mean face is initialized, it can lead to an error W. In the cases that small corruptions appear between the test sample and the faces in the dictionary, the second suggestion could lead to an accurate W. In this case, all elements in W can be close to zero. However, when a lot of corruption appears in the test sample, the naive reconstruction can initialize the IRLS with totally wrong weights.

A test sample without free of corruptions is then desirable for the initialization of the IRLS. The initialization of the IRLS plays a crucial role for the FR performance. Since this is difficult to happen, the algorithm is initialized with a clean from corruption test image that is estimated through the low-rank method IRPCA. That is, IRPCA can be used to reconstruct an approximate clean face to initialize a residual image $\delta_i^0$, which can be sufficient to provide an accurate W after few IRLS iterations.

In order to recover an IRPCA image, at the beginning, a low-rank representation of the face dictionary needs to be recovered. To handle multiple low-rank subspaces, a general rank minimization problem called low-rank representation (LRR) is defined by:

$$\underset{Z,E}{\text{minimize}} \|Z\|_* + \lambda\|E\|_{2,1} \quad (10)$$
$$\text{subject to } T = AZ + E,$$

where $\lambda>0$ is a parameter, and Z is the lowest-rank representation of data T with respect to a dictionary A. In order to recover a discriminative dictionary, the incoherence between class matrices is promoted in the Low-Rank Representation (LRR) problem defined by:

$$\underset{Z,E}{\text{minimize}} \|Z_i\|_* + \lambda\|E_i\|_{2,1} + \frac{\zeta}{2}\sum_{i=1}^{n}\|(A_iZ_i)^T A_iZ_i\|_F^2 \quad (11)$$
$$\text{subject to } T_i = A_iZ_i + E_i,$$

where $Z_i \in \mathbb{R}^{n_i \times n_i}$ is lowest-rank representation of class data $T_i$ with respect to a dictionary $A_i$; i is the $i^{th}$ face class in the dictionary, and $\zeta$ is a scalar parameter.

The goal of IRPCA is to integrate the advantages of both Principal Component Analysis (PCA) and Robust Principal Component Analysis (RPCA). That is, the IRPCA can not only handle data with gross corruptions but also own a good method for processing new data. After obtaining the clear from corruption training faces AZ solving the problem in Formula (11), a low-rank projection matrix $P \in \mathbb{R}^{d \times d}$ multiplies with any face in T. Thus, the process gives the corresponding clear face in AZ. Having learnt how to clean faces from corruptions using the training images, any new data y can be processed and the corruptions can be removed by performing an operation Py. Matrix P can be defined by:

$$\underset{P}{\text{minimize}} \|P\|_* \quad (12)$$
$$\text{subject to } AZ + PT.$$

Formula (12) is convex but not strongly convex. So it is possible that multiple optimal solutions exist. It is proven that the minimizer to Formula (12) is always uniquely defined by:

$$P^* = AZT^+ \quad (13)$$

After P is obtained, a clean image Py can be obtained. Since P is a projection matrix that learns how to remove corruptions, based on the training data, two arguments can be made:
1. Whether the given new sample has a corruption known in the face dictionary cannot be guaranteed. For example, a test sample might have an occluded object that does not appear to any face in training samples.

2. Even if the occluded object appears (e.g., sunglasses) in training samples, whether the occluded object looks like the one in the test sample cannot be guaranteed.

Thus, the learnt corruptions in P may be different from one in test samples. In order to prevent such cases, the process needs to balance between the Py image and the mean $\overline{AZ}$ image. Thus, the clean image is introduced to represent as, $$y_c = \theta Py + (1-\theta)\overline{AZ}, \quad (14)$$

where $0 \leq \theta \leq 1$. $\theta$ can be estimated empirically, and small values should be given to datasets where training samples are clean and no corruptions can be learnt.

Table 1 shows an IRPCA initialization algorithm. The entire process for estimating P is offline, so significant overhead to the classification process cannot be added. The algorithm for calculating $y_c$ is summarized in Algorithm 1 in Table 1.

TABLE 1

Algorithm 1: IRPCA initialization algorithm
Algorithm The IRPCA initialization Algorithm Inputs: LRR(y, T).
  1) Estimate offline the low-rank matrices Z and P solving the problems in (10) and in (12) respectively.
  2) Estimate $y_c = \theta Py + (1 - \theta)\overline{AZ}$
Output: vector $y_c$ After the clean image is obtained, $\delta_i^0 = [y_c - y]_i$ may be used to initialize a low-rank representation with an $l_1$ half quadratic (LRR-HQ-L1) algorithm (S4104). That is, the OLD approach, namely an LRR-HQ-L1 algorithm, is presented in Algorithm 2 in Table 2.

TABLE 2

Figure 7:
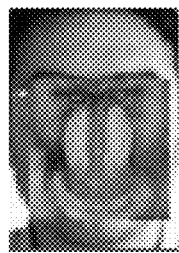
FIG. 7 illustrates another exemplary robust collaborative representation process consistent with the disclosed embodiments.
Figure 7:
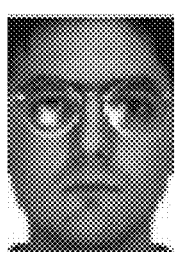
Figure 7:
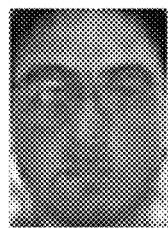
Figure 7:
Figure 7:
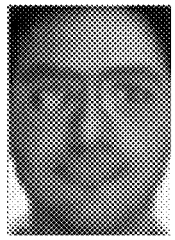
Figure 7:
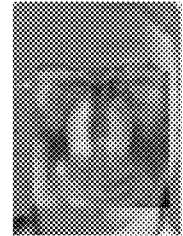
Figure 7:
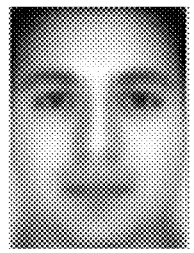
Figure 7:
Figure 7:
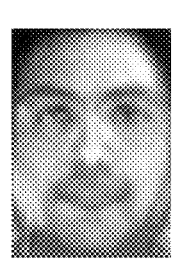
Figure 7:
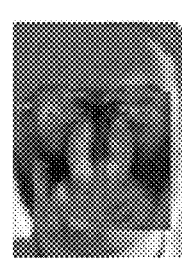

Algorithm 2: LRR-HQ-L1 algorithm
Algorithm The Outlier Detection LRR-HQL1 Algorithm 1:   function LRRHQL1(y,T)
2:     Calculate $y_c$ = LRR(y, T)
3:     Initialize $\delta_i^1 = [y_c - y]_i$ and t = 1
4:     repeat
5:       $\hat{w}_i^{(t)} = \frac{\phi'(\delta_i^t)}{\delta_i^t}, i = 1, \ldots, d$
6:       $\hat{a}^{(t)} = \text{argmin}_a \|W^t(y - Ta)\|_2^2 + \lambda\|a\|_1$
7:       t = t + 1
8:       $\delta_i^t = [Ta^{t-1} - y]_i$
9:     until $\frac{\|w^t - w^{t-1}\|_2}{\|w^t\|_2} < \epsilon_w$ or $t > \epsilon_t$
10:     Return W
11:   end function FIG. 7 illustrates another exemplary robust collaborative representation process consistent with the disclosed embodiments. As shown in FIG. 7, the first row shows an example test face from an AR face database with 50% block occlusion and its corresponding ground truth image. The second row shows a reconstructed face $y_c$ using Algorithm 1. The reconstructed face looks like a target identity (more noise needs to be removed), and it is served as a good candidate for the initialization of Algorithm 1. The next image shows a weight image learnt by LRR-HQ-L1 Algorithm 2. The last two images show a reconstructed face Tâ after classification and an error image y−Tâ between a test sample and dictionary samples. In the third row, the first image is a mean image Ta, where $$a^0 = \left[\frac{1}{n}, \ldots, \frac{1}{n}\right]$$

estimated by training samples. It is obvious that this image does not look like the target identity. The second image is the weight image. The third image shows the reconstructed image after classification and the last image is an estimated error between the test sample and dictionary samples. It is clear that better estimation of the error can be obtained by initializing the Algorithm 1 with $y_c$.

After obtaining the weight W, a classification task is processed (S4106). CLF is solved by using the $l_2$ collaborative representation since the $l_2$ collaborative representation can provide better recognition rates than the $l_1$ optimization problems in environments without occlusions or corruptions. Since an outlier detection mask W is provided, the classification task can be treated as an occlusion or corruption free task. As used herein, the $l_1$ half quadratic minimization is integrated with the $l_2$ collaborative representation for classification.

An estimation vector f for classification is used by solving the regularized least squares problem.

$$f = \operatorname{argmin}_f \|W(y - Tf)\|_2^2 + \lambda \|f\|_2^2 \quad (15)$$

where $f \in \mathbb{R}^n$ is the estimated vector.

After the vector f is obtained, the identity of the face class is given by the same way as in the SRC. A Robust Collaborative Representation (RCR) algorithm is summarized in Algorithm 3 in Table 3.

TABLE 3

Algorithm 3: RCR algorithm
Algorithm The Classification RCR Algorithm

Inputs: Vector y and matrices T, W = LRRHQL1(y, T).
1) Estimate: $\hat{f}$ solving the problem, $$\hat{f} = \operatorname{argmin}_f \|W(y - Tf)\|_2^2 + \lambda \|f\|_2^2,$$

2) Compute the residuals for each class i as,
$e_i(y) = \|W(y - T_i \hat{f}_i)\|_2$,
where $\hat{f}_i$ is the coding coefficient vector associated with class i.
Output: Identity of y as, Identity(y) = $\operatorname{argmin}_i \{e_i\}$.

The $l_1$ minimization is used to solve the classification task. The method identifies Robust sparse coding (RSC) and $l_1$ HQ. By choosing the $l_2$-norm to solve the outlier detection problem, the process identifies Regularized Robust Coding (RRC) with the $l_2$. In RRC, the $l_1$ or $l_2$ minimization problems are transformed into an iteratively reweighted regularized robust coding problems with a designed weight function for robust face recognition.

Solving the classification task with $l_1$ is not optimal in corruption free environments. Similarly, for the outlier detection algorithm, since the linear system in face recognition (FR) is always underdetermined, choosing to solve the outlier detection problem with $l_2$ could overfit the data and might lead to an inaccurate W and poor FR recognition.

Since a face recognition task can be split into two parts, OLD and CLF, the recognition rate can be improved by combining multiple outlier detection and classification algorithms.

Further, an Additive Robust Collaborative Representation Classifier (ARCR-C) is provided, where residual of each class is defined by:

$$e_i(y) = \sum_{j=1}^k \xi_j e_i^j(y) \quad (16)$$

where $e_i^j(y)$ denotes the residual of the $i^{th}$ class of the $j^{th}$ classifier and is defined by:

$$e_i^j(y) = \|W_j(y - T_i f_i^j)\|_2, \quad (17)$$

where $W_j$, $f_i^j$ and $\xi_j$ denote the weight outlier detection matrix, the estimated vector and the weight of the $j^{th}$ classifier, respectively.

Different outlier detection algorithms that can provide different weight matrices W are chosen. In Formula (16), when k=2, the followings are used to solve the outlier detection algorithm described in Algorithm 1 but with two different initializations, that is, $\delta_i^0 = [y_c - y]_i$, and $\delta_i^0 = [Ta^0 - y]_i$ with $$a^0 = \left[\frac{1}{n}, \ldots, \frac{1}{n}\right].$$

Assuming that the weight matrix is from the first initialization $W_{lrr}$ and from the second initialization $W_{mean}$, the subject's identity is then defined by the two classifiers, $$\text{Identity}(y) = \operatorname{argmin}_i \{\xi_1 e_i^{lrr} + \xi_2 e_i^{mean}\} \quad (18)$$

The description of the ARCR-C algorithm is summarized in Algorithm 4 in Table 4.

TABLE 4

Algorithm 4: ARCR-C algorithm
Algorithm The Additive Robust Collaborative Representation Classifier (ARCR-C)

Inputs: Vector y and matrix T.
1) Estimate $W_{lrr}$ solving the problem in (8) with $\delta_i^0 = [y_c - y]_i$, then estimate $\hat{f}_1$, $$\hat{f}^1 = \operatorname{argmin}_f \|W_{lrr}(y - Tf)\|_2^2 + \lambda \|f\|_2^2,$$

2) Estimate $W_{mean}$ solving the problem in (8) with $\delta_i^0 = [Ta^0 - y]_i$ and $a^0 = \left[\frac{1}{n}, \ldots, \frac{1}{n}\right]$,
then estimate $\hat{f}_2$, $$\hat{f}^2 = \operatorname{argmin}_f \|W_{mean}(y - Tf)\|_2^2 + \lambda \|f\|_2^2,$$

3) Compute the residuals for each class i as,
$e_i^{lrr}(y) = \|W_{lrr}(y - T_i \hat{f}_i^1)\|_2$
$e_i^{mean}(y) = \|W_{mean}(y - T_i \hat{f}_i^2)\|_2$
where $\hat{f}_i$ is the coding coefficient vector associated with class i.
Output: Identity of y as, The performance of a face recognition system depends on two metrics, the recognition rate and computational complexity. The classification algorithm 3 is fast since there is a closed form solution to a regularized least square problem. However, the outlier detection algorithm is an iterative algorithm and an $l_1$ minimization problem is solved in each iteration.

It can be shown that the estimated support of the $l_1$ problem through the iterations does not significantly change. In other words, the same faces are chosen to reconstruct the test sample through the iterations. After the $t^{th}$ iteration, the support does not change or converge to a very small number. If this $t^{th}$ iteration is known, the process can just get the support of the previous one and solve a very fast least squares problem for the next iteration.

The $t^{th}$ iteration denoted by $t_c$ is empirically chosen. The iterations after having a fixed support are defined by:

$$\hat{w}_i^{(t+1)} = \frac{\phi'(\delta_i^t)}{\delta_i^t}, \quad (19)$$
$$i = 1, \ldots, d$$

$$a^{(t+1)} = \begin{cases} \min_a \|W^{t+1}(y - Ta)\|_2^2 + \lambda\|a\|_1, & \text{if } t < t_c \\ \min_a \|W^{t+1}(y - \tilde{T}a)\|_2^2, & \text{otherwise} \end{cases} \quad (20)$$

where the dictionary $T \in \mathbb{R}^{d \times n}$ is given by, $$T = TM \quad (21)$$

with $M \in \mathbb{R}^{n \times n}$ being a diagonal matrix where its elements i, i are given by, $$M_{i,i} = \begin{cases} 0, & \text{if } \hat{a}_i^{(t_c-1)} = 0 \\ 1, & \text{otherwise} \end{cases} \quad (22)$$

where $\hat{a}_i^{(t_c-1)}$ is the $i^{th}$ component of the estimated vector $a^{(t_c-1)}$ at the $t_c-1$ iteration.

The description of the FAST-LRR-HQ_L1 algorithm is summarized in Algorithm 5 in Table 5.

TABLE 5

Algorithm 5: FAST-LRR-HQ_L1 algorithm
Algorithm The Fast LRR-HQL1 Algorithm

| | |
|---|---|
| 1: | function FAST-LLRHQL1(y, T, $t_c$) |
| 2: | Calculate $y_c$ = LRR(y, T) |
| 3: | Initialize $\delta_i^1 = [y_c - y]_i$ and t = 1 |
| 4: | repeat |
| 5: | $\hat{w}_i^{(t)} = \frac{\phi'(\delta_i^t)}{\delta_i^t}, i = 1, \ldots, n$ |
| 6: | if >= $t_c$ then |
| 7: | if t = $t_c$ then |
| 8: | Construct and Store $\tilde{T}$ according to (19) |
| 9: | end if |
| 10: | $\hat{a}^{(t)} = \text{argmin}_a \|W^t(y - \tilde{T}a)\|_2^2$ |
| 11: | else |
| 12: | $\hat{a}^{(t)} = \text{argmin}_a \|W^t(y - Ta)\|_2^2 + \lambda\|a\|_1$ |
| 13: | end if |
| 14: | t = t + 1 |
| 15: | $\delta_i^t = [Ta^{t-1} - y]_i$ |
| 16: | until $\frac{\|w^t - w^{t-1}\|_2}{\|w^t\|_2} < \epsilon_w$ or $t > \epsilon_i$ |
| 17: | Return W |
| 18: | end function |

Several seconds per image might be required for an $l_1$ estimator, even with small dictionaries. Thus, a large drawback of the $l_1$ minimization is the computational complexity.

On the other hand, $l_2$ minimization is very fast. Furthermore, although the $l_2$ solution is dense, the highest peaks are similar to the $l_1$ solution and correspond to the training images that match the identity of the test image. The $l_2$ has a similar shape to $l_1$ and is likely to serve as a good approximation. This correlation is largely related to the fact that both obtain global solutions on similar error functions with different norm constraints.

The Algorithm 5 can be speeded up by substituting the $l_1$ problem in line-12 with a regularized least squares problem. Then, the smaller values of the estimated dense vector can be supressed to zero according to a criteria. This approximated $l_1$ process can be written in two steps.

1. the regularized least square problem is solved by:

$$v = \text{argmin}_v \|y - Tv\|_2^2 + \lambda\|a\|_2^2, \quad (23)$$

where $v \in \mathbb{R}^d$.

2. few values of the estimated vector v is supressed to zero according to a criteria to obtain the final estimated vector a as needed in line-12 of Algorithm 5, $$\hat{a}_i = \begin{cases} 0, & \text{if } \hat{v}_i < \bar{v} \\ v_i, & \text{otherwise} \end{cases} \quad (24)$$

where $\bar{v}$ denotes the mean of the estimated vector v.

Returning to FIG. 4, after face recognition of the video is completed, the video with the recognized face images is outputted (S412). For example, the video with recognized face may be displayed to the user, or the video with recognized face may be provided to another program or device for further processing.

By using the disclosed systems and methods, many advantageous applications can be implemented. The face recognition techniques may be applied to the news video domain where faces of key persons in a video can be automatically detected and recognized to facilitate various multimedia management tasks, such as news video summarization, retrieval and browsing.

It is understood that the disclosed face recognition model is not limited to TV usage scenario. The disclosed systems and methods can also be applied to any devices with displays, such as smart phones, tablets, PCs, smart watches, and so on. The disclosed methods can also be applied as the core function for other systems, such as content-based video recommendation systems, content-based video retrieval systems, and so on.

Further, although the face recognition method is disclosed for illustrative purposes, similar concept and approach can be applied to other recognition systems, for example, image recognition, etc. Other applications, advantages, alternations, modifications, or equivalents to the disclosed embodiments are obvious to those skilled in the art.

What is claimed is:

1. A face recognition method, comprising:
   dividing an input video into different sets of frames;
   detecting faces of each frame in the input video;
   generating face tracks for the input video;
   applying a robust collaborative representation-based classifier to recover a clean image from complex occlusions and corruptions for a face test sample from one of the face tracks and performing classification; and
   outputting a recognized face identity of the face test sample based on results from the classification;
   wherein applying the robust collaborative representation-based classifier to recover the clean image from complex occlusions and corruptions for the face test sample and performing classification further includes:
   estimating the clean image through an inductive robust principal component analysis (IRPCA) algorithm to initialize a low-rank representation with an $l_1$ half quadratic (LRR-HQ-L1) algorithm;
   estimating a weight matrix through the LRR-HQ-L1 algorithm;
   performing classification through the robust collaborative representation (RCR) algorithm; and
   giving a final decision of a class identity of the face test sample based on classification results from the RCR algorithm.

2. The method according to claim 1, wherein:
   an outlier detection inputs the face test sample denoted as y and a face dictionary T, and produces a weight diagonal matrix W as the weight matrix, the outlier detection (OLD) is defined by:

$$W=OLD(y,T)$$

wherein $y \in \mathbb{R}^d$ denotes the face test sample; $T=[T_i, \ldots, T_c] \in \mathbb{R}^{d \times n}$ denotes a matrix with a set of samples of c subjects stacked in columns; and $T_i \in \mathbb{R}^{d \times n_i}$ denotes the $n_i$ set of samples of the $i^{th}$ subject, such that $\Sigma_i n_i = n$.

3. The method according to claim 2, wherein:
Py represents a face image obtained by removing corruptions from the face test sample based on training data in the face dictionary, and $\overline{AZ}$ represents a mean image from the training data, the clean image is defined by:

$$y_c = \theta Py + (1-\theta)\overline{AZ},$$

wherein $0 \leq \theta \leq 1$ and $\theta$ is estimated empirically.

4. The method according to claim 3, wherein:
an estimation vector f for classification is defined by:

$$f = \operatorname{argmin}_f \|W(y-Tf)\|_2^2 + \lambda \|f\|_2^2,$$

where $f \in \mathbb{R}^n$ is the estimated vector; $y \in \mathbb{R}^d$ denotes the face test sample; $T=[T_i, \ldots, T_c] \in \mathbb{R}^{d \times n}$ denotes the matrix with the set of samples of c subjects stacked in columns; $\lambda$ is a parameter greater than 0; and W is a weight diagonal matrix.

5. The method according to claim 4, wherein:
an additive robust collaborative representation classifier (ARCR-C) inputs the face test sample y and the face dictionary T and residual of each class is defined by:

$$e_i(y) = \Sigma_{j=1}^k \xi_j e_i^j(y)$$

wherein $\xi_j$ is a weight of the $j^{th}$ classifier; k is an integer greater than 1; $e_i^j(y)$ denotes the residual of the $i^{th}$ class of the $j^{th}$ classifier and is defined by:

$$e_i^j(y) = \|W_j(y - T_i f_i^j)\|_2,$$

wherein $W_j$ is a weight outlier detection matrix; $f_i^j$ is an estimated vector; and $T_i \in \mathbb{R}^{d \times n_i}$ denotes the $n_i$ set of samples of the $i^{th}$ subject, such that $\Sigma_i n_i = n$.

6. The method according to claim 5, wherein:
the weight matrix diagonal is from a first initialization $W_{lrr}$ and from a second initialization $W_{mean}$ and an identity of a subject is defined by:

$$\text{Identity}(y) = \operatorname{argmin}_i \{\xi_1 e_i^{lrr} + \xi_2 e_i^{mean}\}$$

$y \in \mathbb{R}^d$ denotes the face test sample; $e_i^{lrr}$ denotes the residual of the $i^{th}$ class of the first classifier; $e_i^{mean}$ denotes the residual of the $i^{th}$ class of the second classifier; $\xi_1$ is a weight of the first classifier; and $\xi_2$ is a weight of the second classifier.

7. The method according to claim 1, wherein:
the classification (CLF) process inputs the face test sample y, the face dictionary T and the weight diagonal matrix W and an estimated class index is defined by:

$$\text{Identity}(y) = CLF(y, T, W).$$

8. A face recognition system, comprising one or more processors, memory, and one or more program modules stored in the memory and to be executed by the one or more processors, the one or more program modules including:
a face detection module configured to find automatically, location of faces in a sequence of video frames;
an algorithm module configured to recover a clean image from complex occlusions and corruptions for a face test sample obtained from the face detection module through an inductive robust principal component analysis (IRPCA) algorithm to initialize a low-rank representation with an $l_1$ half quadratic (LRR-HQ-L1) algorithm and estimate a weight matrix through the LRR-HQ-L1 algorithm;
a face classifier configured to perform classification through a robust collaborative representation (RCR) algorithm;
a dictionary configured to store face images in a database; and
an output module configured to output recognized face identity of the face test sample based on results from the face classifier;
wherein:
an outlier detection inputs a face test sample y and a face dictionary T, and produces a weight diagonal matrix W as the weight matrix,
the outlier detection (OLD) is defined by:

$$W = OLD(y, T)$$

wherein $y \in \mathbb{R}^d$ denotes the face test sample; $T=[T_i, \ldots, T_c] \in \mathbb{R}^{d \times n}$ denotes a matrix with a set of samples of c subjects stacked in columns; and $T_i \in \mathbb{R}^{d \times n_i}$; denotes the $n_i$ set of samples of the $i^{th}$ subject, such that $\Sigma_i n_i = n$.

9. The system according to claim 8, wherein:
a classification (CLF) process inputs the face test sample y, the face dictionary T and the weight diagonal matrix W, an estimated class index is defined by:

$$\text{Identity}(y) = CLF(y, T, W).$$

10. The system according to claim 8, wherein:
Py represents a face image obtained by removing corruptions from the face test sample based on training data in the face dictionary, and $\overline{AZ}$ represents a mean image from the training data, the clean image is defined by:

$$y_c = \theta Py + (1-\theta)\overline{AZ},$$

wherein $0 \leq \theta \leq 1$ and $\theta$ is estimated empirically.

11. The system according to claim 10, wherein:
an estimation vector f for classification is defined by:

$$f = \operatorname{argmin}_f \|W(y-Tf)\|_2^2 + \lambda \|f\|_2^2,$$

where $f \in \mathbb{R}^n$ is the estimated vector; $y \in \mathbb{R}^d$ denotes the face test sample; $T=[T_i, \ldots, T_c] \in \mathbb{R}^{d \times n}$ denotes the matrix with the set of samples of c subjects stacked in columns; $\lambda$ is a parameter greater than 0; and W is a weight diagonal matrix.

12. The system according to claim 11, wherein:
an additive robust collaborative representation classifier (ARCR-C) inputs the face test sample y and the face dictionary T, residual of each class is defined by:

$$e_i(y) = \Sigma_{j=1}^k \xi_j e_i^j(y)$$

wherein $\xi_j$ is a weight of the $j^{th}$ classifier; k is an integer greater than 1; $e_i^j(y)$ denotes the residual of the $i^{th}$ class of the $j^{th}$ classifier and is defined by:

$$e_i^j(y) = \|W_j(y - T_i f_i^j)\|_2,$$

wherein $W_j$ is a weight outlier detection matrix; $f_i^j$ is an estimated vector; and $T_i \in \mathbb{R}^{d \times n_i}$ denotes the $n_i$ set of samples of the $i^{th}$ subject, such that $\Sigma_i n_i = n$.

13. The system according to claim 12, wherein:
a weight matrix diagonal is from a first initialization $W_{lrr}$ and from a second initialization $W_{mean}$, an identity of a subject is defined by:

$$\text{Identity}(y) = \operatorname{argmin}_i \{\xi_1 e_i^{lrr} + \xi_2 e_i^{mean}\}$$

$y \in \mathbb{R}^d$ denotes the face test sample; $e_i^{lrr}$ denotes the residual of the $i^{th}$ class of the first classifier; $e_i^{mean}$ denotes the residual of the $i^{th}$ class of the second classifier; $\xi_1$ is a weight of the first classifier; and $\xi_2$ is a weight of the second classifier.

\* \* \* \* \*